United States Patent [19]

Warwick et al.

[11] 4,428,462
[45] Jan. 31, 1984

[54] LOW DISPLACEMENT DISC BRAKE CALIPER ASSEMBLIES

[75] Inventors: Edward H. Warwick, Englewood; Donald L. Parker, Middletown, both of Ohio

[73] Assignee: General Motors Corporation, Detroit, Mich.

[21] Appl. No.: 353,561

[22] Filed: Mar. 1, 1982

[51] Int. Cl.³ .......................................... F16D 55/18
[52] U.S. Cl. .................................. 188/72.4; 188/347
[58] Field of Search ............ 188/347, 348, 351, 353, 188/368, 369, 106 A, 370, 106 P, 72.4, 106 R, 72.5, 106 F, 72.6, 72.3, 216, 72.1, 71.8, 71.2, 196 A, 181 T

[56] References Cited

U.S. PATENT DOCUMENTS

| 2,213,948 | 9/1940 | Bowen | 188/347 |
| 3,645,362 | 2/1972 | Scheibe | 188/196 A X |
| 3,828,894 | 8/1974 | Crossman | 188/347 X |

*Primary Examiner*—Douglas C. Butler
*Attorney, Agent, or Firm*—D. D. McGraw

[57] ABSTRACT

A small take-up piston moves outward during the first increment of hydraulic pressure, taking up the clearance with low fluid displacement because of small size of this piston. As a predetermined pressure level is reached, the take-up and power pistons are locked together and thereafter both pistons move outwardly in unison. This greatly reduces the displacement over a single stage piston traveling the same distance. It allows additional retractive clearance without commensurate displacement required to reactuate the caliper.

4 Claims, 10 Drawing Figures

LOW DISPLACEMENT DISC BRAKE CALIPER ASSEMBLIES

The invention relates to disc brake caliper assemblies having high piston retraction for reducing or eliminating brake shoe drag, with reduced displacement requirements for brake application.

Several different arrangements are disclosed which embody the invention. In all arrangements a small take-up piston moves outwardly during the first increment of application of hydraulic brake fluid pressure. This move takes up the clearance designed into the entire brake assembly so that low drag or zero drag is obtained when the brake is released. At a predetermined appropriate hydraulic brake fluid actuating pressure, the small take-up piston and a larger power piston are latched or locked together. This may occur by a predetermined amount of movement of the smaller take-up piston relative to the larger power piston, or at and in response to the attainment of a predetermined increment of hydraulic fluid actuating pressure. As the hydraulic fluid actuating pressure continues to increase, both pistons move outwardly in the brake apply direction in a unitary manner. This power stroke is relatively short and therefore requires less total displacement than is the case when the entire piston area is acted upon and moved by the actuating pressure for the entire application cycle.

IN THE DRAWINGS

Figure 3:
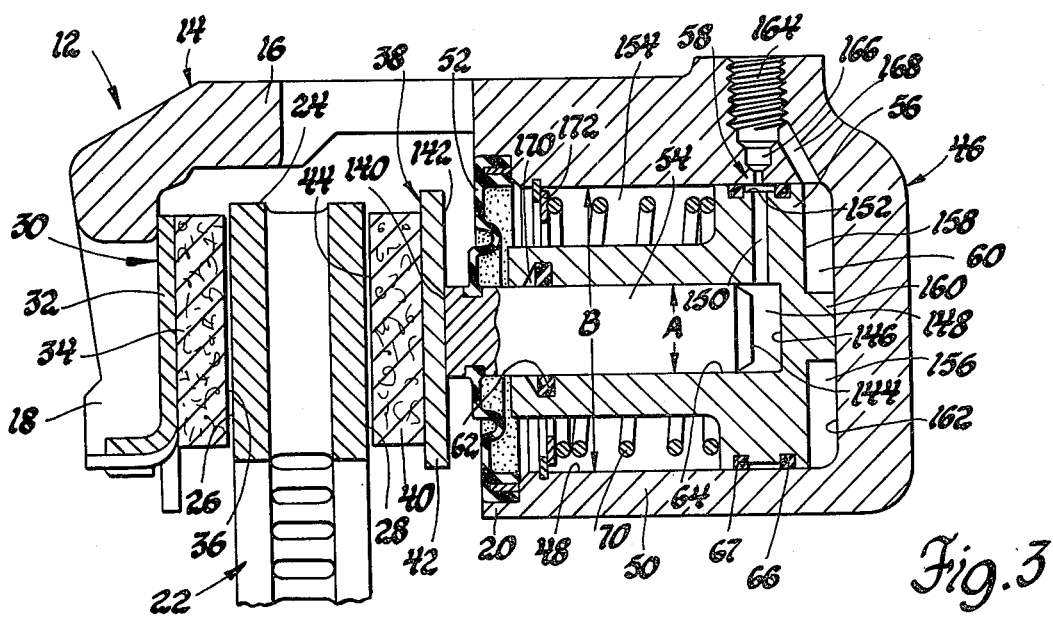
FIG. 3 is a cross section view, with parts broken away, of a disc brake caliper assembly embodying the invention in a modified form in which trapped fluid provides a hydraulic lock arrangement as the latching means, the fluid being trapped upon a predetermined brake apply movement of the power piston.
Figure 10:
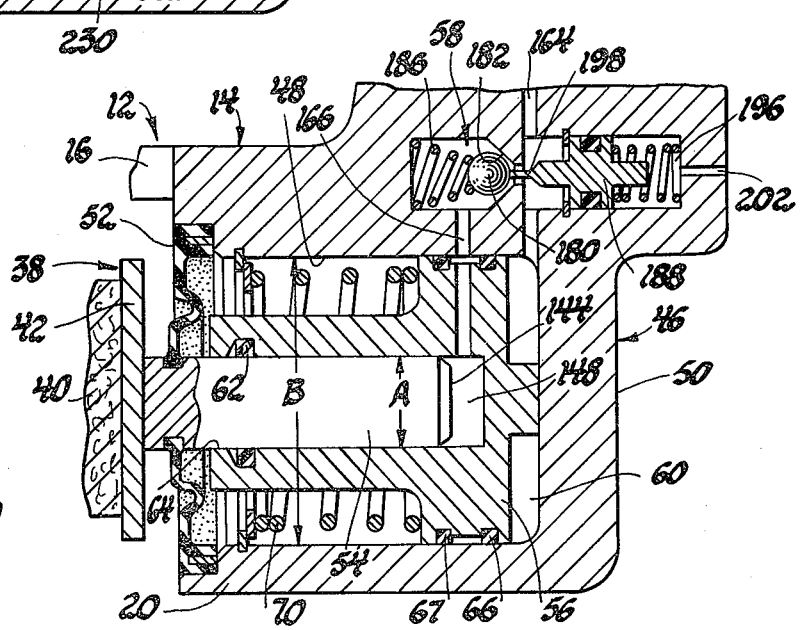

FIG. 10 is a fragmentary cross section view, with parts broken away, of a disc brake caliper assembly similar to that of FIG. 3 and embodying another form of the invention wherein trapped fluid provides a hydraulic lock latching means, the trapped fluid being controlled by a pressure responsive check valve arrangement in the housing forming the actuating cylinder of the assembly, the trapped fluid also being trapped upon sufficient movement of the power actuating piston in a manner similar to the assembly of FIG. 3.

All of the disc brake assemblies embodying the invention have certain common features which are described below with regard to FIG. 1, similar reference characters being used in all of the other Figures as appropriate. The disc brake caliper assembly 12 includes a caliper 14 formed to define a bridge section 16 joining the caliper outboard leg 18 and inboard leg 20. The assembly 12 is illustrated as being of the sliding caliper type well known in the art. It is installed over the disc 22 to be braked so that the bridge 16 extends across the outer periphery 24 of the disc, leg 18 is spaced from but generally adjacent the disc outboard braking surface 26, and leg 20 is generally adjacent but spaced from the disc inboard braking surface 28. A brake shoe assembly 30 is suitably mounted on outboard leg 18. This shoe assembly is illustrated as being comprised of a backing plate 32 and brake lining 34. One side of the lining is secured to the backing plate and the other side of the lining provides a friction braking surface 36 which is positioned for braking engagement with disc braking surface 26. An inboard brake shoe assembly 38 is provided on the inboard side of disc 22 and includes brake lining 40 mounted on a backing plate or backing section 42. Lining 40 has a friction braking surface 44 positioned to engage disc braking surface 28 in friction braking relation when the brake is actuated.

The assembly 12 includes a fluid pressure actuator 46 formed as a part of and contained in the caliper inboard leg 20. Actuator 46 includes suitable cylinder 48 formed in the cylinder housing 50. This housing is preferably an integral part of the caliper inboard leg 20. In some of the modifications illustrated in the drawings, cylinder 48 is a stepped cylinder, and in other modifications it is of a constant diameter. The open end of the cylinder 48 near brake shoe assembly 38 is sealed by a boot seal 52. A take-up piston 54 and a power piston 56, sometimes respectively referred to as the first piston and the second piston, are reciprocably received within cylinder 48. The details of these pistons in relation to cylinder 48 may vary with different disclosed modifications. A suitable latching means 58 is provided to latch or lock the two pistons together as will be described in further detail. An actuating fluid pressure chamber 60 is defined within cylinder 48. Brake actuating fluid under pressure is introduced into this chamber in a well-known manner, acts directly or indirectly on the first piston 54, depending upon the particular modification, and acts on the second piston 56. The effective area of piston 54 exposes directly or indirectly to actuating pressure in chamber 60 is identified by the letter A. The letter B is used to identify the effective area of piston 56 upon which actuating fluid pressure in chamber 60 may act. In some modifications the effective area B is the entire area of piston 56 exposed directly to pressure in chamber 60. In other modifications the effective area B is less than total area of piston 56 by the amount of area A. However, in discussing the effective areas of the two pistons, it will be understood that the reference letters A and B refer to such effective areas. In all modifications the first piston is provided with a seal 62 which seals against a cylinder wall 64 in which piston 54 is movable. Likewise, the second piston 56 is provided with a seal 66, and in some instances with two slightly spaced seals referred to as seals 66 and 67, which seal against a cylinder wall 68 within which the second piston 56 is movable. In all modifications illustrated, a retracting spring 70 is provided to act on second piston 56 with a suitable retraction force. Pistons 54 and 56 cooperate to provide a compound piston assembly 72 with the surface 74 of piston 54 being the surface having effective area A, and the surface 76 of piston 56 being the surface having effective area B.

Figure 1:
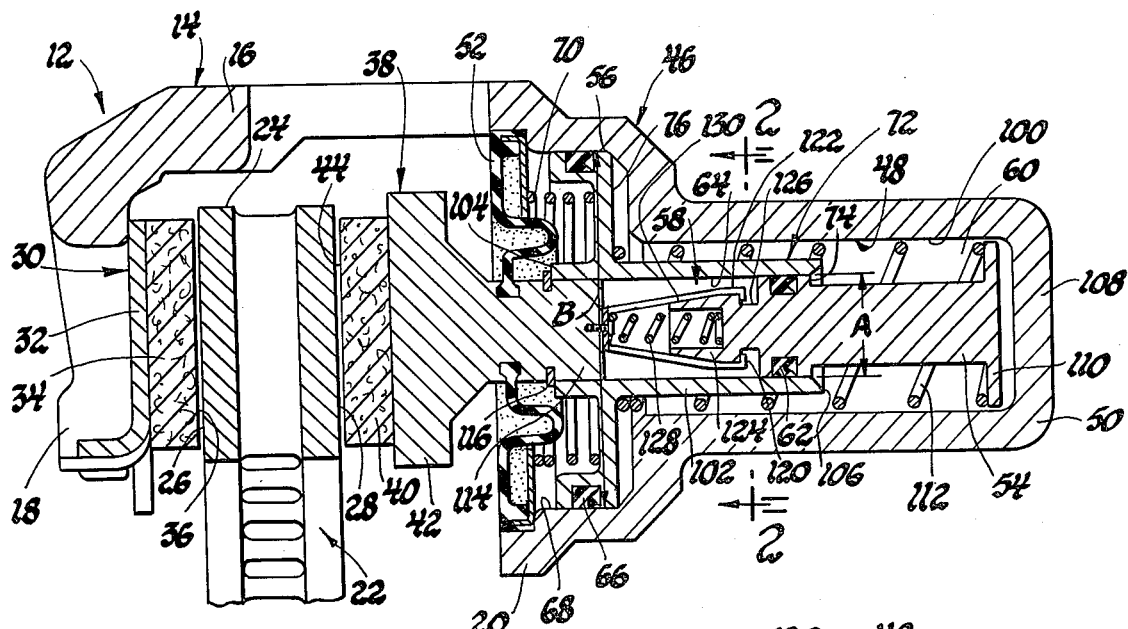
FIG. 1 is a cross section view of a disc brake caliper assembly embodying one arrangement of the invention, parts being broken away.
Figure 2:
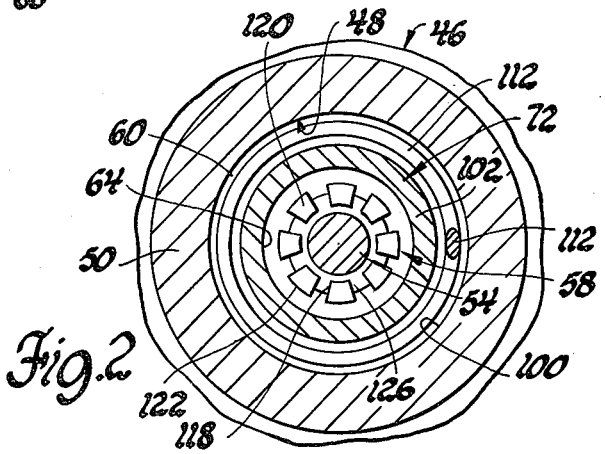
FIG. 2 is a fragmentary cross section view taken in the direction of arrows 2—2 of FIG. 1 and further illustrating the latching means of the assembly of FIG. 1.

The specific construction of the embodiment of the invention shown in FIGS. 1 and 2 will now be further described. Piston 56 is positioned within cylinder wall 68, which is a stepped part of cylinder 48 having a larger diameter than the cylinder wall portion 100. Piston 56 has a generally tubular center portion 102 which extends outwardly and terminates with an end 104. It also extends inwardly into cylinder wall portion 100 and has an inward end 106 which terminates in axially spaced relation to the end wall 108 of housing 50. The inner wall of piston center portion 102 between ends 104 and 106 defines the cylinder wall 64, and first piston 54 is reciprocably received therein. Piston 54 has a flanged inward end 110 positioned within cylinder wall portion 100 and axially intermediate second piston end 106 and end wall 108. A compression spring 112 acts on piston flange end 110 and the portion of second piston surface 76 slightly radially outward of piston cylinder portion 102 so that first piston 54 is continually urged in an inward direction relative to second piston 56. The brake shoe backing section 42, in the particular construction illustrated in FIG. 1, includes a piston-like inward extension 114 which extends through second piston end 104 and into cylinder wall 64. The inner periphery of boot seal 54 is suitably secured to section 42. A stop member 116, illustrated as a ring positioned in a groove formed in extension 114, is engagable by piston end 104. It is normally so engaged when the brake assembly is in the released position.

The latching means 58 of FIGS. 1 and 2 includes radially expandable fingers and a cam mechanism for expanding the fingers to latch pistons 54 and 56 together when desired. The expandable fingers 118 are generally shaped like an elongated cup, having slits between the fingers extending from the cup open end through the cup side toward the small diameter cup closed end. The assembly forming the fingers is suitably secured to extension 114 of back section 42. The free outer ends of fingers 118 are turned radially inward to provide finger tab ends 120. The radially outer surfaces 122 of fingers 118, adjacent ends 120, are positioned slightly radially inward from cylinder wall 64 in the free position of the fingers. A cam end 124 of first piston 54 is positioned within fingers 118 and has a groove 126 formed to receive finger tab ends 120. A compression spring 128 within the assembly forming fingers 118 acts on the inward end of extension 114 and on the outward end of piston 54 to continually urge that piston inwardly relative to backing section 42, and therefore to continually urge the finger tab ends 120 into engagement with one side of groove 126. In this position, the cone-shaped cam surface 130 of piston cam end 124 is sufficiently retracted relative to fingers 118 so that the finger outer surfaces 122 are not engaged with cylinder wall 64. When piston 54 moves outwardly toward disc 22 relative to second piston 56, under the influence of fluid actuating pressure in chamber 60 acting across the effective area A of piston 54, force is exerted through spring 128 to concurrently compress the spring and move backing section 42 towards disc 22. As spring 128 is compressed, cam surface 130 engages fingers 118 and force is also then exerted through the cam and finger mechanism to backing section 42. As the force increases, the fingers are expanded radially by the camming action of cam surface 130 until the finger outer surfaces 122 engage cylinder wall 64. By the time this occurs, brake lining 40 is in light surface engagement with disc braking surface 28. The reaction of the actuating pressure in chamber 60 on cylinder housing 50 also slides caliper 14 to move lining 34 of the outboard brake shoe assembly 30 into light surface engagement with disc brake surface 26. This action has therefore taken up the clearances between the linings and the disc braking surfaces provided for substantial elimination of brake drag while the brake is released. It is accomplished with low fluid displacement because of the small size of the take-up piston 54. During the application of this first increment of hydraulic actuating pressure the power piston 56 is not moved to any major extent because the force generated by the hydraulic pressure acting across effective piston area B is not sufficient to compress retracting spring 70 more than a nominal amount. Therefore the large displacement which would result by movement of piston 56 is obviated during the first increment of actuating pressure increase.

As the actuating pressure in chamber 60 further increases, it acts on pistons 54 and 56 to move them in a unitary manner because the finger surfaces 122 have frictionally latched piston 54 to piston 56. This stage of actuation generates the desired amount of braking effort as the disc 22 is squeezed by the brake linings 34 and 40 in accordance with the amount of actuating pressure. Relatively little movement of pistons 54 and 56 occurs because the linings are already engaged with the disc. Therefore a small amount of hydraulic displacement is required to accomplish the desired braking action.

When actuating pressure is released, retracting spring 70 moves piston 56 away from disc 22. So long as the pressure is above that value which keeps latching means 58 in the latched condition piston 54 will also move, as will backing section 42 in the brake releasing direction. This will generate sufficient clearance between the disc braking surface 28 and lining surface 44 to permit low or zero drag operation. The caliper 14, by virtue of a suitable mounting arrangement well known in the art, will also move lining 34 in the released direction to provide similar clearance between the disc braking surface 26 and lining braking surface 36. When the actuating pressure has decreased below the value at which the fingers 118 remain expanded into engagement when cylinder wall 64, spring 128 and spring 112 will move piston 56 relative to piston 56 until the finger tab ends resist such additional movement, and the assembly will be returned to the position illustrated in FIG. 1.

FIGS. 3, 4, 9 and 10 show various arrangements using a trapped fluid hydraulic lock for the latching means between the take-up piston and the power piston. In FIG. 3, the power piston 56 has a center section provided with an axially extending recess, the wall of which provides the cylinder wall 64. Piston 54 is reciprocably received in the recess and extends outwardly so that its end 140 abuts the back side 142 of backing plate 42. The other end 144 of piston 54 cooperates with the closed end 146 of the recess to define an actuating pressure chamber section 148. A passage 150 is formed radially through a portion of piston 56 and connects chamber section 148 with a peripheral groove 152 formed in the outer wall of piston 56. Seals 66 and 67 are spaced axially on either side of groove 152 so as to seal the cylinder section 154 on the outward side of the cylinder 48 from the main section 156 of the cylinder forming, with the end surface 158 of piston 56, the actuating fluid pressure chamber 60. A short extension 160 extending axially inward of the brake assembly from piston end surface 158 provides an abutment which engages the end wall 162 formed by cylinder housing 50. This maintains the major portion of the area of end surface 158 in spaced relation to end wall 162 so that actuating pressure may readily act on piston 56 across the effective area B. An actuating pressure inlet 164 in housing 50 is connected by a passage 166 to the portion of the cylinder wall 48 which is in alignment with groove 152 when piston 56 is in the fully released position indicated. The force of retracting spring 70 positions piston 56 to provide this connection while the brake is released. Another passage 168 connects inlet 164 with the chamber main section 156 of pressure chamber 60. Seal 62 is mounted in a groove 170 formed in piston 56 through an outer portion of cylinder wall 64, the seal and groove being constructed and arranged to provide retraction and adjustment of piston 54 relative to piston 56. This seal and groove retraction and adjustment arrangement for a piston in a cylinder is well known in the art. Retracting spring 70 is provided with a spring seat 172 fixed in the outer end of cylinder wall 48.

During the first increment of increase in fluid actuating pressure entering inlet 164, the pressure is exerted on piston end 144 across effective area A and on recess closed end 146 over the same effective area. It is also exerted on end surface 158 of piston 56 and opposed by the force of retracting spring 70. The pressure acting on end 144 of piston 54 moves that piston outwardly relative to cylinder wall 48. This movement in turn moves and distorts seal 62, and moves brake shoe assembly 38 until lining surface 44 engages the disc braking surface 28. The reaction of the actuating fluid pressure on recess closed end 146 tends to act in the same direction on the piston 56 as does retracting spring 70. The pressure also reacts on end wall 162 of housing 50, causing the caliper 14 to move in the brake actuating direction until the lining surface 36 engages the outboard disc braking surface 26. The net force generated by actuating pressure on piston 56 is opposed by the force of spring 70 as the first increment of actuating pressure is fully attained. The brake shoes are in position for brake action, having taken up the clearances with low fluid displacement because of the small size of piston 54.

As the full pressure value of the first increment of actuating pressure is attained, piston 56 has also moved axially in the brake applying direction sufficiently to close off the connection of passage 166 with groove 152. This occurs when seal 66 moves across the end of passage 166 opening through cylinder wall 48. Fluid is therefore trapped in chamber section 148 to provide a hydraulic lock between pistons 54 and 56. As the actuating pressure further increases, it acts across the entire end surface 158 of piston 56 and moves the pistons in the brake actuating direction. Because of the hydraulic lock, piston 54 moves in a unitary manner with piston 56 and braking force is exerted on disc 22 by brake linings 34 and 40.

Upon brake release, the pressure in chamber section 156 is reduced and retracting spring 70 moves pistons 54 and 56 in the retracting direction as a unit until seal 66 clears passage 166. This immediately vents the trapped fluid in chamber section 148 to the reduced pressure at inlet 164 and permits seal 62 to move piston 54 relative to piston 56 for further retraction of the brake shoe assembly 38. At the same time the caliper 14 is retracted in a manner well known in the art so that brake shoe assembly 30 is also retracted relative to disc 22. The caliper assembly is then returned to the released position illustrated in FIG. 3.

Figure 4:
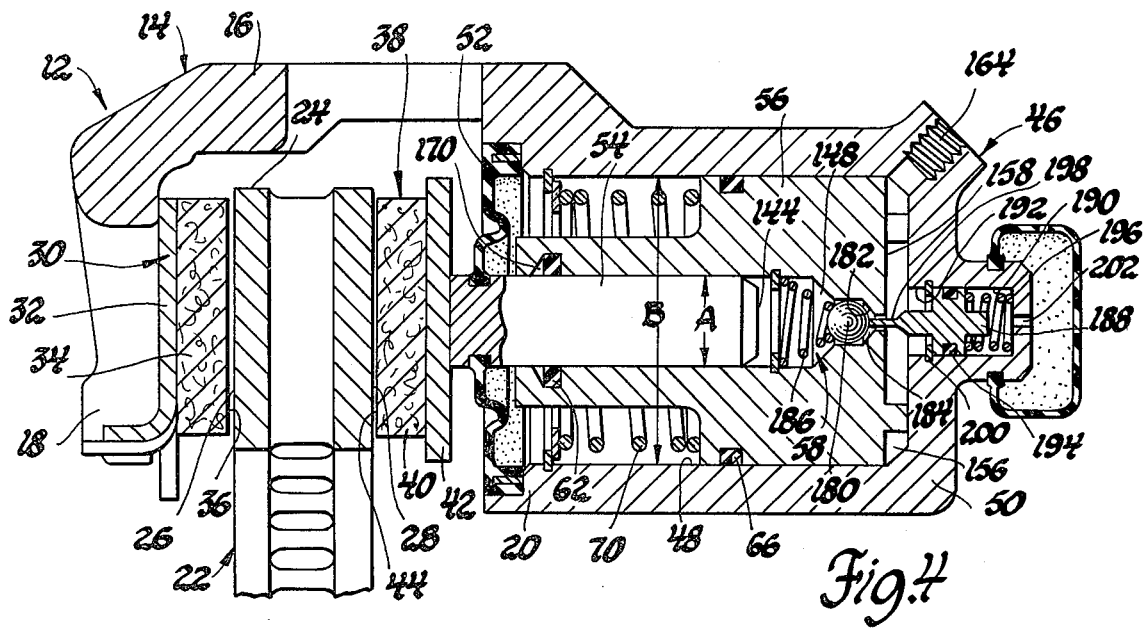
FIG. 4 is a cross section view, with parts broken away, of a disc brake assembly embodying another modification of the invention wherein trapped fluid provides a hydraulic lock as the latching means.

In FIG. 4, the piston and seal arrangement is similar to the structure of FIG. 3, and fluid is trapped in chamber section 148. In this arrangement, however, a ball check valve 180 is positioned to cooperate with a valve seat 182 formed in a passage 184 connecting chamber section 148 with chamber section 156. Spring 186 is positioned in chamber 148 and acts against ball-check valve to continually urge it toward engagement with valve seat 182. A piston 188 is reciprocably received in a small cylinder section formed in housing 50. One end 192 of the cylinder section opens into chamber section 156 in axial alignment with passage 184 and the cylinder defined by cylinder wall 64. A seal 194 is provided on piston 188 and a spring 196 continually urges the piston 188 toward pistons 54 and 56. Piston 188 has a pin section 198 extending through passage 184 and of such a length that ball-check valve 18 is held off of its seat 182 to fluid connect chamber sections 148 and 156 in the released condition shown in FIG. 4. A suitable stop 200 is provided in cylinder section 190 adjacent end 192 and normally locates piston 188 and pin 198. The portion of the cylinder section 190 containing spring 196 is vented at 202 and a suitable boot 204 protects the vent from contamination.

When brake fluid actuating pressure is applied to chamber section 156 through inlet 164, it is also applied through the first increment of pressure increase to chamber section 148, where it acts on the end surface 144 of piston 54 across effective area A to move that piston relative to piston 56. It also acts on end surface 158 of piston 56 and moves that piston slightly in the actuating direction against the force of retracting spring 70. When the first increment of actuating pressure is attained in chamber section 156, it has exerted sufficient force on piston 188 against the force of spring 196 to move pin 198 out of engagement with ball check valve 180, allowing the check valve to seat on seat 182. This traps fluid in chamber section 148 so that further pressurization of the actuating fluid in chamber section 156 causes both pistons 54 and 56 to move in the brake actuating direction in a unitary manner. Since the effective area of passage 184 is quite small in relation to the area of the ball check valve 180 exposed to the trapped pressure in chamber 148, the ball check valve remains closed during the additional pressure increase. The actuating pressure has thus taken up the clearances of the brake linings with a relatively small displacement of fluid and the brakes are then actuated with a force generated across a relatively large effective area as described above with regard to FIGS. 1 and 3.

Upon release of the actuating pressure at inlet 164, retracting spring 70 moves both pistons 54 and 56 in the retracting direction. The decrease in pressure in chamber 156 also permits movement of pin 198 toward ball-check valve 180. The pin and the check valve engage and the valve is lifted from its seat, venting the trapped fluid in section 148 to chamber section 156. Piston 54 is then returned to its retracted position in a manner similar to that described for FIG. 3.

Figure 9:
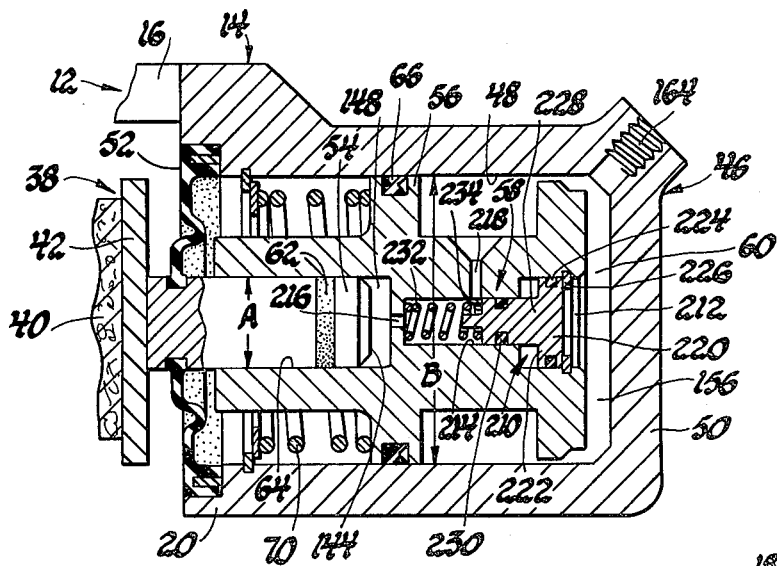
FIG. 9 is a fragmentary cross section view of a disc brake caliper assembly similar to the caliper assembly of FIG. 3 and embodying another modified form of the invention in which trapped fluid is used to provide a hydraulic lock type latching means, the latching means being contained primarily in the power piston and responsive to brake actuating pressure.

FIG. 9 is similar to FIG. 4 but has a modified latching means located entirely within piston 56. A stepped recess 210 is formed in the inward end of piston 56 in axial alignment with the cylinder defined by cylinder wall 64. Recess 210 includes a larger diameter section 212 opening into the main section 156 of pressure chamber 60. A smaller diameter recess section 214 extends from section 212 toward the chamber section 148, and terminates in a passage 216 connecting chamber section 148 and recess section 214. A radially extending passage 218 is formed in piston 56 and communicates with the main section 156 of pressure chamber 60. The inlet 164, to which hydraulic brake fluid pressure is delivered, is connected directly to pressure chamber 60. A stepped piston 220 is reciprocably received in recess 210. It has a larger diameter section 222 provided with a seal 224 reciprocably sealing it in recess section 212. A ring 226 in the outer end of recess section 212 provides a piston stop for piston 220. The smaller diameter section 228 of piston 220 is similarly received in recess section 214 and has a seal 230. A compression spring 232 in recess section 214 continually urges piston 220 toward stop 226. When the assembly is in the released position shown, the outer end 234 of piston 220 clears the end of passage 218 opening into recess section 214 so that there is fluid communication from chamber 60 to chamber section 148 through passage 218, recess section 214 and passage 216.

During the first increment of actuating pressure increase in chamber 60, the pressure acts to move piston 54 outwardly to take up clearance between the disc and the inboard lining. At the same time, caliper 14 is moved to take up clearance between the disc and the outboard lining. Meanwhile, the effective pressure acting on piston 220 moves that piston against the force of spring 232 until the piston end 234 closes off passage 218. This traps fluid in chamber section 148 so that further increase in actuating pressure in chamber 60 moves piston 54 and 56 in a unitary manner as described above.

Upon brake release, retracting spring 70 moves both pistons inwardly. When the actuating pressure decreases to a sufficient extent, spring 232 moves piston 220 so as to open passage 218 and relieve the pressure trapped in chamber section 148. Thus the assembly returns to the released position. It is understood that the caliper 14 moves during actuation and release as above described.

FIG. 10 is quite similar to FIG. 4, but has the latching means located in the body of cylinder housing 50, and also includes a latching means arrangement like that of FIG. 3. In this arrangement either closure of the ball-check valve 180 or movement of the piston 56 until seal 66 closes passage 166 will trap fluid in chamber section 148. The trapped fluid acts as a latching means between pistons 54 and 56 and the structure operates in a manner more fully described above with regard to FIGS. 3 and 4.

Figure 5:
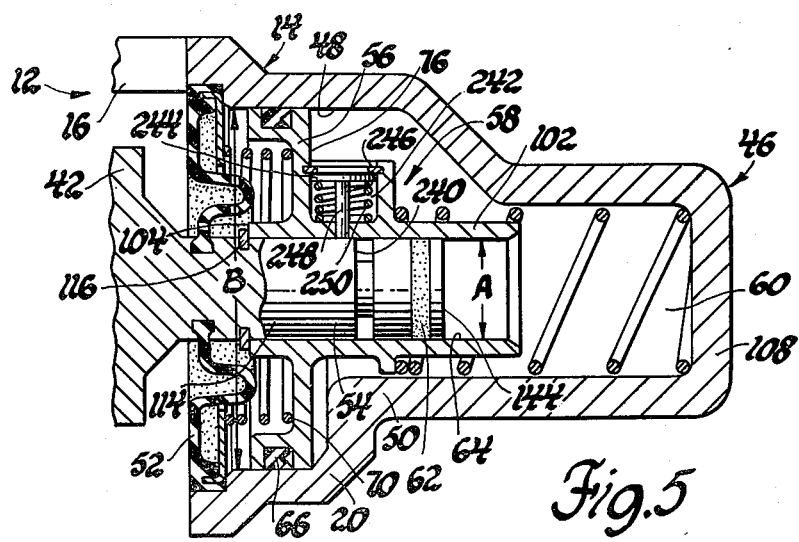
FIG. 5 is a fragmentary cross section view of a disc brake caliper assembly similar to the assembly of FIG. 1, but embodying the invention in still another modified form wherein a pressure applied spring released pin fits into a groove upon sufficient movement of the take-up piston relative to the power piston.
Figure 6:
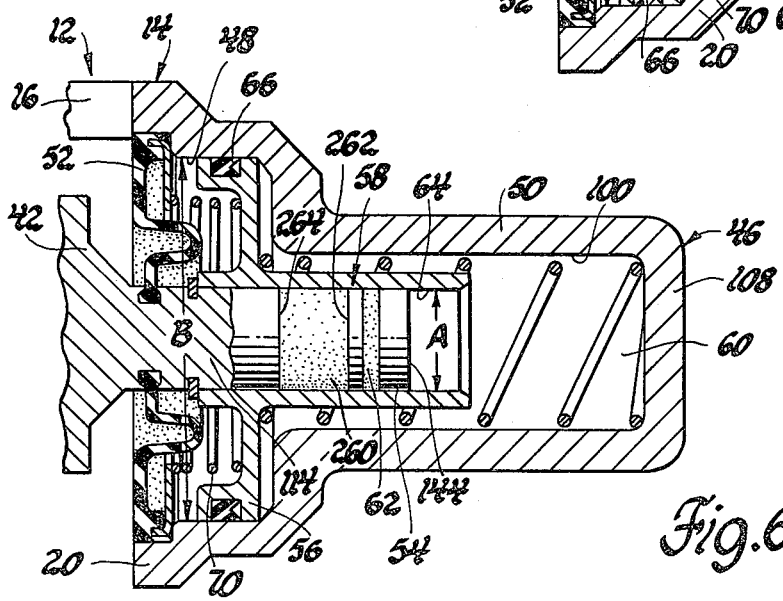
FIG. 6 is a fragmentary cross section view of a disc brake caliper assembly similar to that of FIG. 5 but embodying another modified form of the invention in which a rubber disc clutch arrangement responsive to brake actuating pressure provides the latching means.
Figure 7:
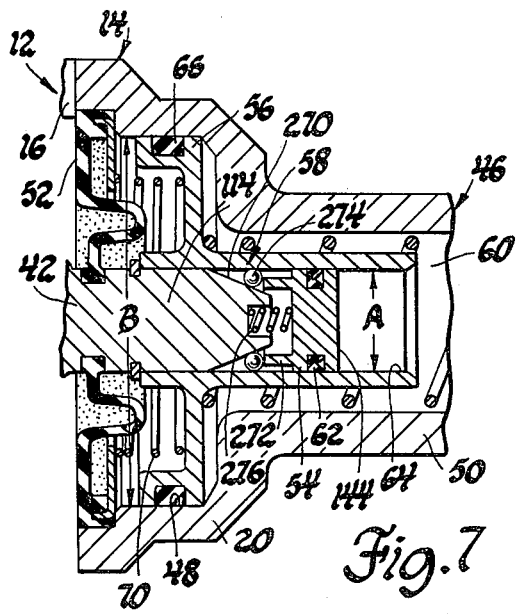
FIG. 7 is a fragmentary cross section view of a disc brake assembly similar to FIGS. 5 and 6 and yet another modified form of the invention wherein a brake actuating pressure-responsive ball-and-cam latching means is used.

FIGS. 5, 6, 7 and 8 provide different locking arrangements in a first and second piston arrangement similar to that of FIG. 1. FIG. 5 uses a spring released, pressure actuated pin latching one piston to the other by means of a pin-and-groove arrangement. FIG. 6 uses a pressure compressible rubber disc or plug to obtain the desired latching result. FIG. 7 includes a rolling cam lock, and FIG. 8 uses a pressure responsive latching piston.

Piston 54 of FIG. 5 has a groove 240 provided therein between the location of seal 62 and the backing section 42, the backing section 42 having an extension 114 which is intregral with piston 54. A portion of piston 56 adjacent surface 76 and located on piston center portion 102 includes a radially extending recess 242 in which a piston 244 is reciprocably and sealing received. A ring 246 in the open end of recess 242 provides a piston stop. The piston 244 has a pin 248 extending therefrom into cylinder wall 64 and engaging the outer surface of piston 54. A spring 250 in recess 242 continually urges the piston 244 toward stop 246 so that piston 54 can move freely within cylinder wall 64 insofar as pin 248 is concerned when the brake is released. During initial increase in brake actuating pressure in chamber 60, the pressure acts against end surface 144 of piston 54 to move that piston outwardly to take up clearance between the inner brake shoe assembly 38 and disc 22. At the same time, pressure acting on the cylinder housing 50 moves caliper 14 to take up clearance between the outboard brake assembly 30 and disc 22. The pressure also acts on piston 244, and as groove 240 moves into alignment with pin 248, the pin is forced into the groove, latching the two pistons together. Further increase in brake actuating pressure in actuating chamber 60 then moves both pistons 54 and 56 in a unitary manner as described above. Upon brake release, retracting spring 70 moves both pistons in the release direction. When the actuating pressure decreases to a sufficient extent, pin 248 is moved out of groove 240 by spring 250. The caliper assembly 14 is also retracted in a manner well known in the art.

FIG. 6 has a relatively short piston 54 sliding within cylinder wall 64. A compressible rubber disc or plug 260, having an outer diameter slightly less than that cylinder wall 64 so as to be slidably movable therein when the plug is not expanded, is positioned between piston 54 and the piston-like inward extension 114 of backing section 42. Plug 260 is normally in engagement with end surface 262 of piston 54 and end surface 264 of extension 114. As the first increment of brake actuating pressure is received in chamber 60, it acts on end surface 144 of piston 54 to move that piston outwardly toward the disc to be braked. This movement transmits force through plug 260 to backing section 42 to move the inboard brake shoe assembly to take up the clearance between lining 40 and disc 22. The rubber plug is sufficiently hard so that at this time it does not compress between surfaces 262 and 264 to a sufficient extent to increase its diameter to the diameter of cylinder wall 64. The caliper 14 is also moved by actuating pressure to engage brake shoe assembly 30 with disc 22. Once the clearance has been taken up, brake shoe assembly 38 and braking section 42 resist further movement. As the actuating pressure further increases, it moves piston 54 relative to backing section extension 114 to compress the rubber plug 260 axially. This causes it to expand radially, and the plug tightly grips cylinder wall 64, effectively latching piston 54 against further movement relative to piston 56. Thereafter as the actuating pressure increases, both pistons 54 and 56 move together in a manner described above. Upon release of actuating pressure, spring 70 retracts both pistons. Rubber plug 260 expands axially as it contracts radially. The rubber plug releases its grip on cylinder wall 64 and piston 54 then moves to the released position relative to piston 56 as illustrated.

In FIG. 7 the backing section extension 114 is tapered to form a conical cam surface 270. Piston 54 has an annular outward extension 272 which fits over the smaller end portion of cam surface 270 so that cam balls 274 are retained within the space between the cam surface 270 and the cylinder wall 64. A compression spring 276, positioned between extension 114 and piston 54, urges the piston in an inward direction tending to unlatch the ball-and-cam latching mechanism. When the brake assembly is actuated, the initial increment of actuating pressure moves piston 54 outwardly and exerts force on backing section 42 through spring 276 to take up the inboard brake shoe clearance. At the same time spring 276 is compressed until at a predetermined actuating pressure the piston extension 272 has moved the balls 274 along cam surface 270 until they wedge and lock against cylinder wall 64. This action locks pistons 54 and 56 together. Additional actuating pressure moves pistons 54 and 56 together as above described. Upon brake pressure release, both pistons are moved inwardly of the brake assembly by retracting spring 70. When the actuating pressure decreases to a value where spring 276 can expand, piston 54 is moved relative to cylinder wall 64 and the latching means 58 is released.

Figure 8:
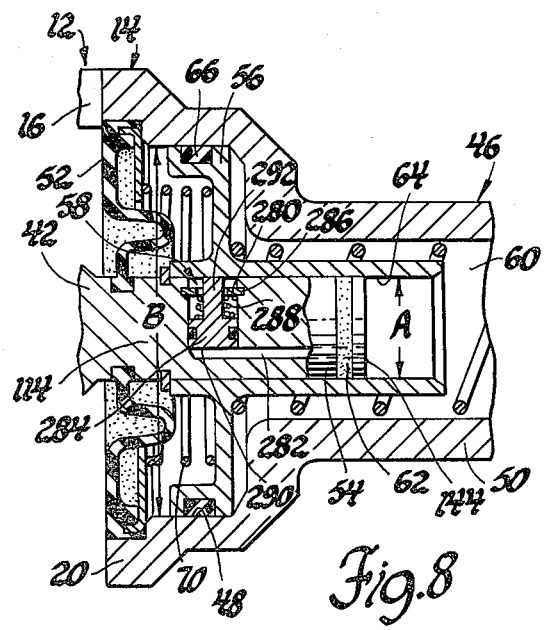
FIG. 8 is a fragmentary cross section view of a disc brake caliper assembly similar to that of FIG. 5 and incorporating a friction latching means which is applied by brake actuating pressure.

In FIG. 8, piston 54 has a radially extending recess 280 formed in a portion of the piston which is an integral extension 114 of backing section 42. A passage 282 extends from the bottom of recess 280 longitudinally to open into chamber 60 through the end surface 144 of piston 54. A piston 284 is sealingly and reciprocably received in recess 280. A ring 286 in the outer portion of the recess provides reaction for a compression spring 288 which urges piston 284 inwardly of recess 280. The piston end 290 is always exposed to pressure in passage 282 and therefore in pressure chamber 60. The outer end 292 of piston 284 is aligned for engagement with cylinder wall 64, but does not engage that wall so long as piston 284 is at the bottom of recess 280. When actuating pressure is introduced into chamber 60, it acts across end surface 144 of piston 54 to move that piston and the inboard brake shoe assembly 38 to take up clearance between the brake lining 40 and disc 22. The pressure also moves caliper 14 as above described to take up the clearance between brake lining 34 of outboard brake shoe assembly 30 and disc 22. This pressure also acts on piston end 290. When the force generated on piston 284 by the actuating pressure is sufficient to overcome the preload of spring 288, the piston end 292 moves slightly radially outward of piston 54 and frictionally engages cylinder wall 64. This action latches pistons 54 and 56 together so that additional brake actuating pressure in chamber 60 moves both of these pistons in a unitary manner. Upon release of actuating pressure, retracting spring 70 moves both pistons in an inward direction within the caliper assembly until the actuating pressure can no longer hold piston end 292 in latching engagement with cylinder wall 64 against the force of spring 288. The latching mechanism is then released and piston 54 may move to the fully released position illustrated in the drawing.

In each of the arrangements disclosed and described, a small displacement piston takes up the disc brake clearance provided for minimum drag, and a much larger piston area then becomes effective to generate the desired braking forces applied to the disc by the brake shoe assemblies while requiring relatively little fluid displacement.

The embodiments of the invention in which an exclusive property or privilege is claimed are defined as follows:

1. A disc brake caliper assembly having a brake shoe assembly adapted to move to engage and disengage a disc to be braked, and a fluid pressure actuator for the brake shoe assembly incorporating reduced displacement and high retraction, said actuator comprising:
   a compound piston assembly including a first piston having a first predetermined area exposed to actuating fluid pressure, and a second piston having a second predetermined area exposed to actuating fluid pressure, said second predetermined area being larger than said first predetermined area;
   and latching means permitting initial actuating movement of said first piston to move the brake shoe assembly into friction braking engagement with the disc in response to initial actuating fluid pressure acting on said first piston and then latching said first piston to said second piston so that further increase in actuating fluid pressure acts on both of said pistons in a unitary manner to increase the friction braking engagement of the brake shoe assembly with the disc.

2. A disc brake caliper assembly having a brake shoe assembly adapted to move to engage and disengage a disc to be braked, and a fluid pressure actuator for the brake shoe assembly incorporating reduced displacement and high retraction, said actuator comprising:
   a compound piston assembly including a first piston having a first predetermined area exposed to actuating fluid pressure, and a second piston having a second predetermined area exposed to actuating fluid pressure, and second predetermined area being larger than said first predetermined area;
   and latching means permitting initial actuating movement of said first piston to move the brake shoe assembly into friction braking engagement with the disc in response to initial actuating fluid pressure acting on said first piston and then latching said first piston to said second piston;
   said latching means including an actuating fluid pressure responsive piston and a latch pin in one of said pistons, and means for receiving said latch pin in latching relation in the other of said pistons so that, at a predetermined actuating fluid pressure sufficient to act on said first piston to move said brake shoe assembly into friction braking engagement with the disc, said latch pin is moved into latching engagement with said receiving means to latch said first and second pistons together to act as a unitary piston on said brake shoe assembly as actuating fluid pressure is further increased to increase the friction braking engagement of the brake shoe assembly with the disc.

3. A disc brake caliper assembly having a brake shoe assembly adapted to move to engage and disengage a disc to be braked, and a fluid pressure actuator for the brake shoe assembly incorporating reduced displacement and high retraction, said actuator comprising:

a compound piston assembly including a first piston having a first predetermined area exposed to actuating fluid pressure, and a second piston having a second predetermined area exposed to actuating fluid pressure, said second predetermined area being larger than said first predetermined area;

and latching means permitting initial actuating movement of said first piston to move the brake shoe assembly into friction braking engagement with the disc in response to initial actuating fluid pressure acting on said first piston and then latching said first piston to said second piston;

said latching means including a clutch mechanism having a piston responsive to actuating fluid pressure to engage said clutch mechanism and lock said piston together after said first piston has been actuated sufficiently to cause said brake pad assembly to engage the disc, said pistons then acting as a unitary piston on said brake shoe assembly as actuating fluid pressure is further increased to increase the friction braking engagement of the brake shoe assembly with the disc.

4. A disc brake caliper assembly having a brake shoe assembly adapted to move to engage and disengage a disc to be braked, and a fluid pressure actuator for the brake shoe assembly incorporating reduced displacement and high retraction, said actuator comprising:

a compound piston assembly including a first piston having a first predetermined area exposed to actuating fluid pressure, and a second piston having a second predetermined area exposed to actuating fluid pressure, said second predetermined area being larger than said first predetermined area;

and latching means permitting initial actuating movement of said first piston to move the brake shoe assembly into friction braking engagement with the disc in response to initial actuating fluid pressure acting on said first piston and then latching said first piston to said second piston;

said latching means including a hydraulic lock arrangement comprising a fluid chamber in said second piston into which said first piston reciprocably extends, said chamber having an inlet into which said initial actuating fluid pressure is introduced to cause said initial actuating movement of said first piston, and valve means associated with said chamber inlet and responsive to a predetermined actuating condition, which reflects the attainment of sufficient actuating fluid pressure to cause said first piston initial actuating movement, to close said inlet and trap actuating fluid in said chamber so that additional actuating fluid pressure acts to move both of said pistons in unitary manner to increase the friction braking engagement of the brake shoe assembly with the disc.

* * * * *